June 30, 1931.    J. A. SPENCER    1,812,722
TEMPERATURE CONTROLLED APPARATUS
Original Filed April 3, 1925    2 Sheets-Sheet 1

Inventor
John A. Spencer
By Roberts, Roberts & Cushman
Att'ys

Inventor
John A. Spencer
by Roberts, Roberts & Cushman,
Att'ys

Patented June 30, 1931

1,812,722

UNITED STATES PATENT OFFICE

JOHN A. SPENCER, OF NEWTONVILLE, MASSACHUSETTS, ASSIGNOR TO SPENCER THERMOSTAT COMPANY, OF CAMBRIDGE, MASSACHUSETTS, A CORPORATION OF MASSACHUSETTS

TEMPERATURE CONTROLLED APPARATUS

Application filed April 3, 1925, Serial No. 20,455. Renewed November 15, 1930.

The present invention relates to temperature controlled apparatus and more particularly to such apparatus embodied in thermostatic controlled sadirons.

As disclosed in the patent to Spencer 1,448,240 granted March 13, 1923, the electric heating circuit of a sadiron may be suddenly opened when the sadiron reaches a predetermined temperature limit and automatically closed when the temperature of the sadiron drops to a certain predetermined lower limit. This is accomplished by the use of a thermostatic member which suddenly and abruptly changes shape at predetermined temperature limits.

This application relates to means for varying the thermostatic control with respect to the temperature of the sadiron or similar apparatus in such a manner that the heating current may be automatically cut off at different temperatures of the sadiron without varying or adjusting the thermostatic control itself. It will be clear that the thermostatic control serves to open or close the heating circuit when the temperature of the control reaches certain predetermined upper and lower limits and that by varying the relation between the temperature of the control and the temperature of the sadiron itself, the opening and closing of the heater circuit may be caused to take place at variable temperature limits of the sadiron.

In one simple form of the invention the temperature of the thermostatic member with respect to the surrounding base of the sadiron is varied by controlling the direct radiation of heat from the heating coil to the space in proximity to the thermostatic member. Inasmuch as the heating coil is at a much higher temperature than either the base of the sadiron or the thermostatic member received therein, it will be evident that by providing for the direct radiation of heat from the heating coil to the member a suitable increase in temperature of the thermostatic member with respect to the base of the sadiron may be secured.

Still further features of the invention consist in certain novel features of construction, combinations and arrangements of parts hereinafter described and claimed, the advantages of which will be obvious to those skilled in the art from the following description.

In the accompanying drawings illustrating a preferred form of the invention, Figure 1 represents an elevation of a sadiron showing certain parts broken away;

Similar reference characters indicate corresponding parts throughout the several views of the drawings.

Figure 1:
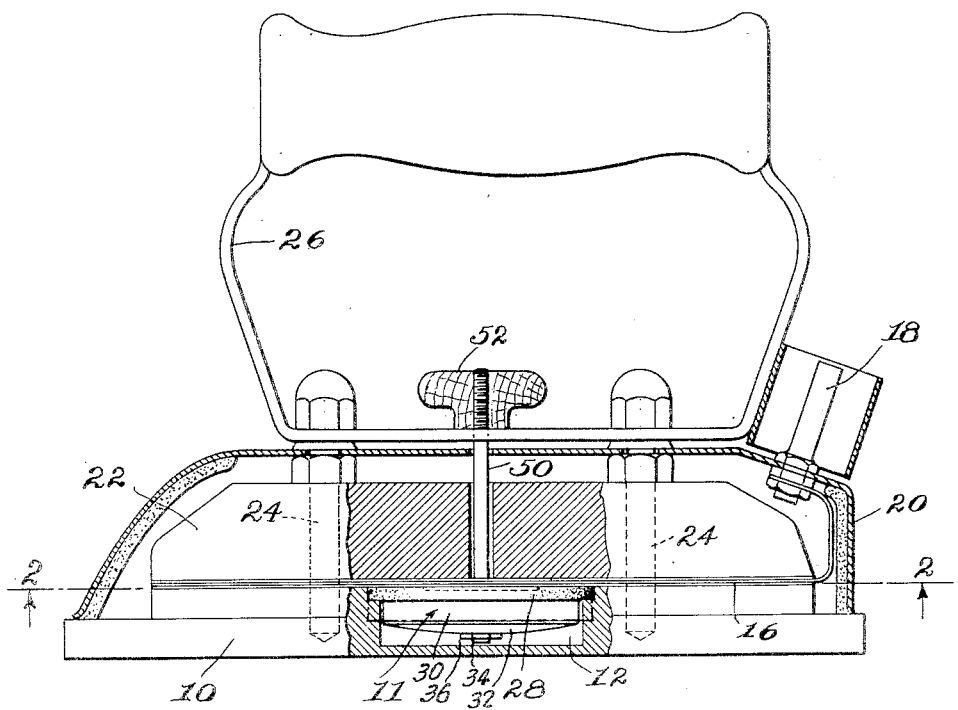

The sadiron shown in the illustrated embodiment of the invention comprises a base member 10 having a recess 12 formed therein in which the thermostat assembly indicated at 11 is located. The base member is surmounted by a flat heating coil 16 of the usual form which is connected to the usual terminal plug 18 mounted upon the sheet metal shell 20. The heating coil is surmounted by a weight member 22 and the several parts are retained in assembled relation by bolts 24, a handle 26 being connected to the iron by the bolts 24.

Figure 3:
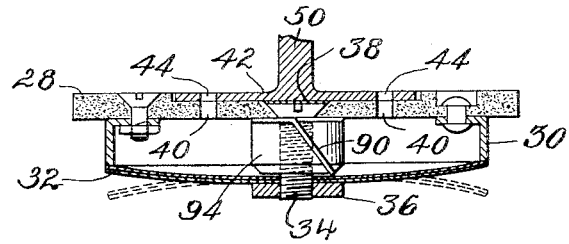
Fig. 3 is a detail illustrating the method of controlling the temperature of the thermostatic disk by radiation.

As indicated clearly in Figs. 1 and 3, the recess 12 is closed by a disk 28 of insulating material which carries a stationary contact ring 30 cooperating with a thermostatic disk 32. The thermostatic disk is mounted upon a supporting stem 34 which may be molded into the disk 28 and is held in place by a locking nut 36. The electric heating circuit includes the stationary contact ring 30, the thermostatic disk 32, stem 34 and a thin contact plate 38 engaging with the stem and connecting the latter with the heating coil.

It will be clear from this construction that the temperature of the thermostatic disk normally approximates the temperature of the base 10 surrounding the disk. The temperature of the disk in the construction shown in Fig. 3 may be controlled, however, by the provision of radiating openings 40 formed in the insulating disk 28 and the provision of a rotary disk member 42 having similar openings 44 which may be caused to register to a greater or less degree with the openings 40, thus governing the amount of heat which is radiated from the heating coil 16 through the openings to the thermostatic disk 32. The position of the control disk 42 may be adjusted by a stem 50 projecting upwardly through the sadiron as indicated in Figs. 1 and 3 and surmounted by a knob 52 through which the stem and control disk 42 may be manipulated.

Figure 4:
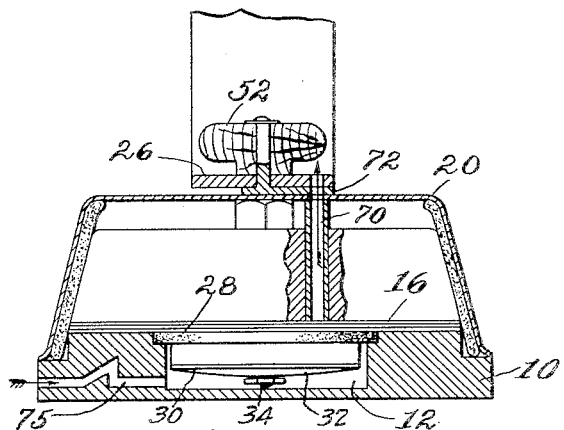
Fig. 4 is a detail illustrating an alternative construction for controlling the temperature of the disk by convection; and, Figs. 5 and 6 are details illustrating the method of controlling the temperature of the disk by conduction from the heating coil.

An alternative method of controlling the temperature of the thermostatic disk with respect to the temperature of the base 10 is indicated in Fig. 4. In this construction, a passage 70 for the flow of convection currents extends from an opening in the disk 28 upwardly through the flatiron venting above the shell 20, this opening being controlled through a perforated disk 72 mounted upon the upper portion of the flatiron and serving to open or close the upper open portion of the passage 70. Formed in the base of the flatiron and leading into the recess 12 is a second passage 75 which cooperates with the passage 70 to establish or set up convection currents. It is clear that this construction, (Fig. 4), as distinguished from the construction shown in Figs. 1 and 3, tends to reduce the temperature of the thermostatic disk with respect to the surrounding base of the sadiron by means of convection currents from the outer atmosphere.

Figure 5:
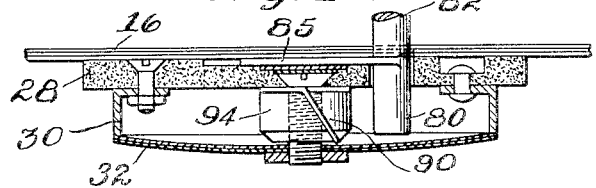
Figure 6:
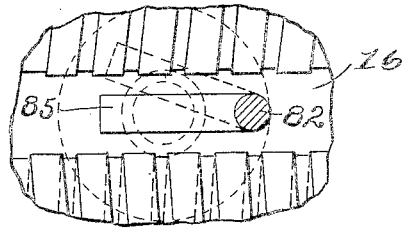

The temperature of the thermostatic member 32 may also be controlled in the manner shown in Figs. 5 and 6 by varying the degree of conduction from the heating coil. To this end a member 80 of relatively small cross-section projects downwardly through the disk 28 into the recess 12, this member being connected to an adjusting stem 82 projecting upwardly through the flatiron and having an arm 85 extending laterally therefrom which is in variable heat conducting relation with a portion of the heating coil as shown in Fig. 6. If the member 80 and arm 85 are formed of metal having a relatively high thermal conductivity, heat will flow from the coil through the arm into the projecting end 80 and thus be transmitted to the thermostatic disk, elevating the temperature of the latter with respect to the surrounding base of the sadiron. By adjusting the arm 85 so that it is either removed from contact altogether with the heating coil or has a greater or less contact therewith, the rate of conduction of heat may be controlled.

Figure 2:
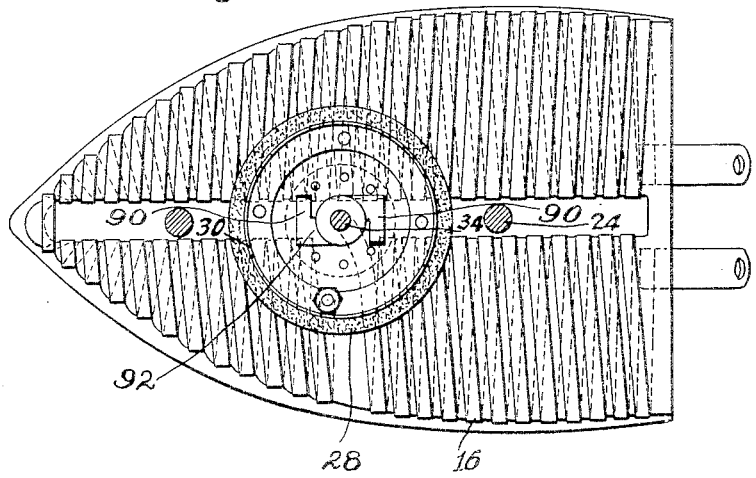
Fig. 2 is a horizontal section taken upon the line 2—2 of Fig. 1.

It is clear that the electric heating circuit is broken by an abrupt change in shape of the thermostatic disk 32, thus removing the disk from contact with the ring 30. It may be desirable during repeated opening and closing movements of the members to present new portions of the disk in contact with the ring 30 and to this end means are provided for partially rotating the disk each time that the circuit is opened. The disk, as shown in Figs. 3 and 5, is engaged while the circuit is closed by inclined spring fingers 90 which press upon the disk and tend to impart a rotation thereto when the latter changes shape to open the circuit. Thus, as the disk recurrently flexes it is shifted around to effect relative rotary movement between the disk and the abutment 30. Consequently if the disk seats on the abutment only at spaced points the wear is distributed. These spring fingers, as shown in Fig. 2, are conveniently formed as a single stamping 92 surrounding the supporting stem and held in place by a hub member 94. When the thermostatic disk is in the position shown in the drawings, the fingers press lightly thereon but with sufficient pressure to exert a slight turning movement when the disk changes direction.

From the foregoing it will be clear that the disk 32 constitutes a rotary element flexible back and forth longitudinally of its axis and that relative rotary movement between the disk and abutment 30 is produced by the springs 90 interposed between the disk and abutment, caused by the movement back and forth of the disk on its axis.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. Temperature controlled apparatus comprising a rotary element part of which is movable back and forth longitudinally of its axis as a result of changes in the temperature to which the apparatus is subjected, and means effective solely to rotate the element about said axis upon movement of part of said element longitudinally of its axis.

2. Temperature controlled apparatus comprising a rotary element part of which is movable back and forth longitudinally of its axis as a result of changes in the temperature to which the apparatus is subjected, and automatic means for rotating the element about said axis as a result of said movement back and forth.

3. Temperature controlled apparatus comprising an element part of which is movable back and forth longitudinally of its axis as a result of changes in the temperature to which the apparatus is subjected, an abutment against which said element abuts at one limit of its movement back and forth, and means for producing relative rotary movement between said element and abutment about said axis to effect different points of contact between the element and abutment.

4. Temperature controlled apparatus comprising an element part of which is movable back and forth longitudinally of its axis as a result of changes in the temperature to which the apparatus is subjected, an abutment against which said element abuts at one limit of its movement back and forth, and automatic means for producing relative rotary movement between said element and abutment about said axis as a result of said movement back and forth to effect different points of contact between the element and abutment.

5. Temperature controlled apparatus comprising an element part of which is movable back and forth longitudinally of its axis as a result of changes in the temperature to which the apparatus is subjected, and a spring inclined circumferentially of said axis for imparting a rotational impulse to said element as the latter moves back and forth.

6. Temperature controlled apparatus comprising an element part of which is movable back and forth longitudinally of its axis as a result of changes in the temperature to which the apparatus is subjected, an abutment at one side of said element, and a spring interposed between said element and abutment for producing relative rotary movement between said element and abutment about said axis.

7. Temperature controlled apparatus comprising a disk flexible back and forth as a result of changes in the temperature to which the apparatus is subjected, and means for supporting the disk to rotate about an axis extending through the disk.

8. Temperature controlled apparatus comprising a disk flexible back and forth as a result of changes in the temperature to which the apparatus is subjected, and automatic means for rotating the disk about an axis extending therethrough as a result of said flexing back and forth.

9. Temperature controlled apparatus comprising a bi-metallic disk constructed to snap abruptly into different shapes in response to temperature changes, and a spring inclined circumferentially of the axis of the disk for imparting a rotational impulse to the disk as the latter moves back and forth.

10. Temperature controlled apparatus comprising a bi-metallic disk constructed to snap abruptly into different shapes in response to temperature changes, an abutment at one side of said disk, and a spring interposed between said disk and abutment for producing relative rotary movement between said element and abutment about said axis.

11. Temperature controlled apparatus comprising a thermostatic member, a base in which the thermostatic member is mounted, a heater member, said members being mounted in heat conducting relation on said base, and means for varying the amount of radiant heat transmitted from the heater member to the thermostatic member.

12. Temperature controlled apparatus comprising a base having a recess formed therein, a thermostatic member in the recess, a heater member located in proximity to the base and adapted to maintain an elevated temperature of the latter, said members being mounted in heat conducting relation on said base, and means for varying the amount of heat radiated from the heater member to the thermostatic member.

13. Temperature controlled apparatus comprising a base having a recess formed therein, a thermostatic member located in the recess, an insulating member closing the recess, a heater member located in proximity to the base and in heat conducting relation thereto, and means for permitting the direct radiation of heat from the heater member to the thermostatic member through the insulator to vary the temperature of the thermostatic member.

14. Temperature controlled apparatus comprising a source of heat energy, a snap acting thermostat adapted to control the source of heat energy in a manner adapted to maintain the thermostat between definite predetermined temperature limits, said thermostat being mounted in heat conducting relation to said source of heat energy and means between said thermostat and said source of heat energy for permitting a predetermined amount of radiant heat to impinge on said thermostat from said source.

15. Temperature controlled apparatus comprising a source of heat energy, a snap acting thermostat adapted to control the source of heat energy in a manner adapted to maintain the thermostat between definite predetermined temperature limits, said thermostat being mounted in heat conducting relation to said source of heat energy, and means comprising a manually adjustable member for permitting a variable quantity of radiant heat from said source to impinge on said thermostat.

16. The combination of a snap acting thermostat and a source of heat energy in heat conducting relation to said thermostat and variable means for controlling the amount of radiant energy falling on said thermostat.

17. In an electrical apparatus, an electrically energized heating unit, a thermostat, switching means associated with the said thermostat for controlling the said heating unit, the said thermostat being in heat conducting relation to the said heating unit, and adjustable means for permitting a predetermined amount of radiant heat to impinge on said thermostat, whereby the temperature limits between which the said thermostat maintains the said apparatus may be varied.

18. In an electrical heating apparatus, the combination of an electrically energized heating element, a thermostat in heat conducting relation thereto, switching means associated with the said thermostat for controlling the said heating element, manually adjustable means for permitting a predetermined amount of radiant heat to impinge on the said thermostat whereby the temperature limits within which the said thermostat maintains the said apparatus may be varied.

19. In an electrical heating apparatus, an electrically energized heating element, a snap acting thermostat, a switching means for controlling the said heating element associated with the said thermostat, the said thermostat being in heat conducting relation to the said heating element, and variable means for allowing a predetermined amount of radiant heat to impinge on the said thermostat, whereby the temperature limits within which the said thermostat maintains the said apparatus may be varied.

20. In an electric sadiron, a heating element, a snap acting thermostat, switching means for controlling the said heating element associated with the said thermostat, a partition between the said heating element and the said thermostat, and means adjustable from the outside of the said iron to vary the quantity of radiant heat impinging on the said thermostat.

Signed by me at Cambridge, Massachusetts, this second day of April, 1925.

JOHN A. SPENCER.